US011932419B2

United States Patent
Varrelmann et al.

(10) Patent No.: US 11,932,419 B2
(45) Date of Patent: Mar. 19, 2024

(54) PROCESSING SYSTEM FOR AIRCRAFT STRUCTURAL COMPONENTS (71) Applicant: Broetje-Automation GmbH, Rastede (DE)

(72) Inventors: Nils Varrelmann, Varel (DE); Volker Neemann, Westerstede (DE)

(73) Assignee: Broetje-Automation GmbH, Rastede (DE)

(*) Notice: Subject to any disclaimer, the term of this patent is extended or adjusted under 35 U.S.C. 154(b) by 0 days.

(21) Appl. No.: 16/633,739

(22) PCT Filed: Apr. 27, 2018

(86) PCT No.: PCT/EP2018/060899
§ 371 (c)(1),
(2) Date: Jan. 24, 2020

(87) PCT Pub. No.: WO2019/020227
PCT Pub. Date: Jan. 31, 2019

(65) Prior Publication Data
US 2020/0231305 A1 Jul. 23, 2020

(30) Foreign Application Priority Data
Jul. 24, 2017 (DE) ...................... 10 2017 116 716.1

(51) Int. Cl.
*B64F 5/10* (2017.01)
*B21J 15/14* (2006.01)
(Continued)

(52) U.S. Cl.
CPC .............. *B64F 5/10* (2017.01); *B21J 15/142* (2013.01); *B21J 15/42* (2013.01); *B23Q 1/4804* (2013.01); *B23Q 1/525* (2013.01); *B23P 2700/01* (2013.01)

(58) Field of Classification Search
CPC ...... B21J 15/142; B21J 15/42; B23P 2700/01; B23P 19/04; B64F 5/10; Y10T 29/49622;
(Continued)

(56) References Cited

U.S. PATENT DOCUMENTS

| 4,967,947 A | 11/1990 | Sarh |
| 5,778,505 A | 7/1998 | Reilly et al. |
| 6,108,896 A * | 8/2000 | Gignac ................... B21J 15/10 227/152 |

(Continued)

FOREIGN PATENT DOCUMENTS

| DE | 3852634 | 6/1995 |
| EP | 0836908 | 4/1998 |

(Continued)

OTHER PUBLICATIONS

"German Search Report," for German Patent Application No. 102017119716.1 dated Jun. 13, 2018 (8 pages).

(Continued)

*Primary Examiner* — Matthew P Travers
(74) *Attorney, Agent, or Firm* — Pauly, DeVries Smith & Deffner LLC (57) ABSTRACT

A processing installation for aircraft structural components having a processing station comprising a clamping frame, wherein the clamping frame extends along a station longitudinal axis which extends in a longitudinal direction, and a processing unit which has an upper tool unit having an upper tool which is orientated along a first tool axis and a lower tool unit having a lower tool which is orientated along a second tool axis, wherein the first tool axis and the second tool axis can be orientated parallel with a vertical direction which is angular, in particular orthogonal, relative to the longitudinal direction, wherein in at least one processing position of the upper tool and in at least one processing position of the lower tool the first tool axis and the second (Continued)

tool axis are orientated coaxially relative to each other, and wherein the lower tool is supported on a lower tool carrier.

19 Claims, 3 Drawing Sheets

(51) Int. Cl.
  *B21J 15/42* (2006.01)
  *B23Q 1/48* (2006.01)
  *B23Q 1/52* (2006.01)
(58) Field of Classification Search
  CPC ........... Y10T 29/49956; Y10T 29/5377; Y10T 29/53961; B23Q 1/4804–4823; B23Q 1/525
  See application file for complete search history.

(56) References Cited

U.S. PATENT DOCUMENTS

| | | | | |
|---|---|---|---|---|
| 6,223,413 | B1 * | 5/2001 | Crocker | B21J 15/10 227/111 |
| 6,478,722 | B1 * | 11/2002 | Graham | B21J 15/10 29/243.53 |
| 7,444,728 | B2 * | 11/2008 | Wesseloh | B21J 15/10 29/34 B |
| 8,220,134 | B2 * | 7/2012 | Burns | B21J 15/142 29/559 |
| 2006/0182557 | A1 | 8/2006 | Frauen et al. | |
| 2012/0030926 | A1 | 2/2012 | Toh et al. | |
| 2016/0008869 | A1 * | 1/2016 | Oberoi | G05B 19/41805 411/506 |

FOREIGN PATENT DOCUMENTS

| | | |
|---|---|---|
| EP | 2682225 | 1/2014 |
| EP | 2939795 | 11/2015 |
| WO | 2019020227 | 1/2019 |

OTHER PUBLICATIONS

"International Search Report and Written Opinion," for PCT Application No. PCT/EP2018/060899 dated Jul. 17, 2018 (15 pages).

* cited by examiner

PROCESSING SYSTEM FOR AIRCRAFT STRUCTURAL COMPONENTS

CROSS-REFERENCE TO RELATED APPLICATIONS

This application is a national stage application under 35 U.S.C. 371 of International Patent Application Serial No. PCT/EP2018/060899, entitled "Processing System For Aircraft Structural Components," filed Apr. 27, 2018, which claims priority from German Patent Application No. DE 10 2017 116 716.1, filed Jul. 24, 2017, the disclosure of which is incorporated herein by reference.

FIELD OF THE TECHNOLOGY

The disclosure relates to a processing installation for aircraft structural components and a method for processing an aircraft structural component having a processing installation.

BACKGROUND

The production of missiles and in particular aircraft involves processing large aircraft structural components, such as, for example, the wings and the fuselage or portions thereof in special processing installations. The known processing installation (U.S. Pat. No. 5,778,505), on which the disclosure is based, has a processing station with a clamping frame for receiving the aircraft structural component which is intended to be processed in each case. The processing station is further provided with a processing unit in the form of a riveting unit, which has an upper tool unit having an upper tool and an associated lower tool unit having a lower tool, wherein, with a coaxial orientation of the tool axis of the upper tool relative to the tool axis of the lower tool, a riveting operation can be carried out on the aircraft structural component.

In the known processing installation, there is provided a C-shaped frame which has an upper frame portion, a lower frame portion and a lateral frame portion which connects the two frame portions to each other, wherein the upper tool is arranged on the upper frame portion via an upper tool carrier and the lower tool is arranged on the lower frame portion via a lower tool carrier. The lower tool carrier is in this case also constructed in a C-shaped manner and is rotatably supported on the lower frame portion. The lower tool carrier also has a lower carrier portion, an upper carrier portion and a lateral carrier portion which connects the upper carrier portion to the lower carrier portion, wherein the lower tool is arranged at the outer end of the upper carrier portion. There is located opposite at the outer end of the lower carrier portion in the vertical direction the rotary mechanism, via which the lower tool carrier is connected to the lower frame portion of the C-shaped frame. The processing station is then configured in such a manner that the two tool axes, that is to say, the tool axis of the upper tool and the tool axis of the lower tool, always extend coaxially relative to the lower tool carrier axis (rotation axis of the lower tool carrier).

During the processing of the aircraft structural component, the clamping frame is rotated between the individual riveting operations about a frame longitudinal axis, wherein the clamping frame can be rotated in total through substantially 180°. In the case of a vertical orientation of the clamping frame, therefore if the two frame portions which are parallel with the frame longitudinal axis are arranged one above the other in a vertical direction, one of the frame portions is arranged inside the C-shaped lower tool carrier, that is to say, between the lower carrier portion and the upper carrier portion of the lower tool carrier, whereas the other frame portion is arranged between the lower tool carrier and the upper frame portion of the C-shaped frame. From this position, the clamping frame is then successively rotated through 180° between the individual riveting operations until the other frame portion is arranged inside the C-shaped lower tool carrier and the clamping frame again has a vertical orientation. In order to allow such vertical orientations of the clamping frame, the processing installation must be configured to be correspondingly large. In particular, the operating height is relatively great, which in turn leads to correspondingly large dimensions of the processing installation in the vertical direction.

SUMMARY

The problem addressed by the disclosure is to configure and develop the known processing installation in such a manner that the operating height and accordingly the dimensions of the installation in the vertical direction can be reduced.

The above problem is solved with a processing installation according to the disclosure.

A significant aspect is the basic consideration of displacing the lower tool carrier axis, that is to say, the rotation axis of the lower tool carrier, so that it is no longer arranged under the lower tool in a vertical direction for each processing step, for example, riveting operation or drilling operation, but instead is offset relative thereto. In other words, the tool axis of the lower tool (second tool axis) is not necessarily always orientated coaxially relative to the lower tool carrier axis, whereby at least in some processing positions of the lower tool a free space can be provided under the lower tool for arranging a portion of the clamping frame and aircraft structural component during processing. In this case, this free space extends between the upper carrier portion of the lower tool carrier, on which the lower tool is supported, and the surface on which the lower tool carrier is rotatably supported. Unlike the prior art, therefore, there is provided a space above said surface, on which the lower tool carrier is supported and which is available over the entire height thereof for receiving a portion of the clamping frame and aircraft structural component. In the prior art, however, this space is partially taken up by a lower portion of the lower tool carrier, via which the lower tool carrier is rotatably connected to the surface below. With respect to the prior art, therefore, the operating height can be reduced, in particular by at least 0.3 m, such as at least 0.4 m, such as at least 0.5 m. Accordingly, the entire height of the processing installation can also be reduced.

In detail, the reduction of the operating height and where applicable reduction of the height of the processing installation is achieved in that in at least one processing position of the upper tool and/or lower tool the respective tool axis extends non-coaxially relative to the lower tool carrier axis. In particular, the respective tool axis is displaced in a parallel manner relative to the lower tool carrier axis, that is to say, the axes are spaced apart from each other and arranged parallel with each other. A processing position of the upper tool or lower tool is intended to be understood to mean a position of the respective tool in which the processing of the aircraft structural component is possible. The processing particularly involves a riveting operation or drilling operation. It may be noted that, in addition to the processing position(s) in which the respective tool axis is non-coaxial or displaced in a parallel manner relative to the lower tool carrier axis, one or more processing positions of the respective tool may also be provided in which the respective tool axis extends coaxially relative to the lower tool carrier axis.

According to various embodiments, the lower tool carrier is rotatably supported at and in particular on a lower frame portion which extends in a transverse direction which is orthogonal to the longitudinal direction and vertical direction. The frame portion is particularly a portion of a frame which carries both the upper tool unit and the lower tool unit. In the at least one processing position, in which the respective tool axis is non-coaxial or displaced in a parallel manner relative to the lower tool carrier axis, the free space which has already been mentioned is then constructed between the lower tool and the lower frame portion.

Such a frame allows a suitable operating height for processing various aircraft structural components, for example, fuselages or wings. The operating height, that is to say, the location at which the upper tool cooperates correctly with the lower tool, is in particular in a range from 5 m to 7 m, such as in a range from 5.5 m to 6.5 m, or in a range from 5.5 m to 6 m.

The lower tool carrier can be configured in completely different manners. In particular, it may have a carrier bar and a carrier tower, wherein the carrier bar is used to support the lower tool and the carrier tower carries the carrier bar. The carrier tower is the component of the lower tool carrier which is rotatably supported. In particular, the carrier tower is rotatably supported on the lower frame portion. The carrier tower and the carrier bar extend in particular orthogonally relative to each other and accordingly form an L-shape. In principle, however, it is also conceivable to provide a lower tool carrier in a C-shape, in which two bars therefore extend from the carrier tower in a vertical direction with spacing from each other, wherein in this case the lower one of the bars has to have a shorter length than the upper one of the bars (carrier bars). This is because only if the upper carrier bar projects beyond the lower bar, can said free space, which extends from the lower frame portion as far as the upper carrier bar or lower tool, also be produced in a C-shape of the lower tool carrier.

Various embodiments provide dimensions of the lower tool carrier.

Various embodiments define different ways in which individual components of the processing installation can move, in particular relative to each other, so that the aircraft structural component which is intended to be processed can be arranged in an optimum manner between the upper tool and the lower tool. For the different movements, in particular rotational movements and linear movements, there may be provided corresponding drive motors which can be actuated independently of each other.

According to various embodiments, a method for processing an aircraft structural component having a processing installation as proposed is provided.

It is significant according to the additional teaching that during the processing of the aircraft structural component, in particular during a riveting operation or drilling operation, the first tool axis and/or the second tool axis extend(s) at least temporarily non-coaxially relative to the lower tool carrier axis, optionally in a manner displaced in a parallel manner relative thereto. In this manner, the operating height can be reduced and accordingly the total height of the processing installation can also be minimized. Furthermore, with regard to the method reference may be made to the preceding explanations in relation to the processing installation.

According to various embodiments, the clamping frame with the aircraft structural component which is intended to be processed and which is arranged thereon can be rotated over an angular range of at least 180° or more about a frame longitudinal axis. The frame longitudinal axis extends in this case along the station longitudinal axis.

Various embodiments provide a processing installation for aircraft structural components having a processing station comprising a clamping frame for receiving the aircraft structural component which is intended to be processed, wherein the clamping frame extends along a station longitudinal axis which extends in a longitudinal direction, and a processing unit for processing the aircraft structural component which has an upper tool unit having an upper tool which is orientated along a first tool axis and a lower tool unit having a lower tool which is orientated along a second tool axis, wherein the first tool axis and the second tool axis are or can be orientated parallel with a vertical direction which is angular, in particular orthogonal, relative to the longitudinal direction, wherein in at least one processing position of the upper tool and in at least one processing position of the lower tool the first tool axis and the second tool axis are orientated coaxially relative to each other, and wherein the lower tool is supported on a lower tool carrier, wherein in at least one processing position of the upper tool and/or in at least one processing position of the lower tool the respective tool axis extends non-coaxially relative to the lower tool carrier axis.

In various embodiments, in the at least one processing position the respective tool axis is displaced in a parallel manner relative to the lower tool carrier axis, wherein in the at least one processing position the maximum adjustable spacing between the respective tool axis and the lower tool carrier axis is at least 1.0 m, such as at least 2.0 m, or at least 3.0 m.

In various embodiments, the lower tool carrier is rotatably supported on a lower frame portion which extends in a transverse direction which is orthogonal to the longitudinal direction and vertical direction, wherein, in the at least one processing position in which the respective tool axis is non-coaxial or displaced in a parallel manner relative to the lower tool carrier axis, a free space is constructed between the lower tool and the lower frame portion and extends in the vertical direction from the lower frame portion as far as the lower tool or as far as a portion of the lower tool carrier on which the lower tool is supported, wherein the free space in the vertical direction has a height of at least 2.0 m, such as at least 2.5 m, or at least 3.0 m.

In various embodiments, the lower tool carrier has a carrier bar, on which the lower tool is supported, and a carrier tower, which is rotatably supported and to which the carrier bar is fixed, wherein the carrier bar extends substantially in a plane which extends in the longitudinal direction and transverse direction and the carrier tower extends substantially in the vertical direction and/or the carrier bar and the carrier tower together form an L-shape.

In various embodiments, the carrier bar is spaced apart from the lower frame portion by at least 2.0 m, at least 2.5 m, or at least 3.0 m, and/or extends in the plane which extends in the longitudinal direction and transverse direction from the carrier tower over a length of at least 2.0 m, at least 2.5 m, or at least 3.0 m, wherein the free space extends between the carrier bar and the lower frame portion over the majority of the length of the carrier bar.

In various embodiments, the lower tool carrier, in particular the carrier tower, is linearly displaceable on the lower frame portion in the transverse direction.

In various embodiments, the lower tool is linearly displaceable on the lower tool carrier, in particular on the carrier bar, in a plane which extends in the longitudinal direction and transverse direction, wherein the second tool axis can be arranged in at least one processing position of the lower tool coaxially relative to the lower tool carrier axis.

In various embodiments, the upper tool is supported on an upper tool carrier, wherein the upper tool carrier is supported on an upper frame portion which extends in the transverse direction, wherein the upper tool carrier is linearly displaceable on the upper frame portion in the transverse direction, wherein the first tool axis can be arranged in at least one processing position of the upper tool coaxially relative to the lower tool carrier axis.

In various embodiments, the lower frame portion and upper frame portion are connected to each other, in particular over at least a lateral frame portion, wherein the lower frame portion, the at least one lateral frame portion and the upper frame portion together form a C-shape or portal-like shape.

In various embodiments, the lower frame portion is linearly displaceable in the longitudinal direction, in particular together with the upper tool unit and lower tool unit.

In various embodiments, the processing installation has a first drive motor for a rotational movement of the lower tool carrier, in particular relative to the lower frame portion, a second drive motor for a linear movement of the lower tool carrier, in particular relative to the lower frame portion, a third drive motor for a linear movement of the lower tool, in particular relative to the lower tool carrier, a fourth drive motor for a linear movement of the carrier bar of the lower tool carrier, in particular relative to the carrier tower of the lower tool carrier, a fifth drive motor for a linear movement of the upper tool carrier, in particular relative to the upper frame portion and/or lower frame portion, and/or a sixth drive motor for a linear movement of the lower frame portion, in particular relative to the substrate, wherein the first drive motor, the second drive motor, the third drive motor, the fourth drive motor, the fifth drive motor and/or the sixth drive motor can be actuated independently of each other.

Various embodiments provide a method for processing an aircraft structural component having a processing installation as disclosed herein, wherein during the processing of the aircraft structural component, in particular during a riveting or drilling operation, the first tool axis and/or second tool axis extend(s) at least temporarily non-coaxially relative to the lower tool carrier axis.

In various embodiments, during the processing of the aircraft structural component, in particular during a riveting or drilling operation, the first tool axis and/or second tool axis is/are at least temporarily displaced in a parallel manner relative to the lower tool carrier axis.

In various embodiments, the clamping frame is pivoted with the aircraft structural component arranged thereon over an angular range of at least 180°, or more than 180°, about a frame longitudinal axis which is and/or can be orientated parallel with the station longitudinal axis.

BRIEF DESCRIPTION OF THE DRAWINGS

Various aspects of the disclosure are explained in greater detail below with reference to the drawings which merely illustrate embodiments. In the drawings.

DETAILED DESCRIPTION

The illustrated processing installation 1 serves to process aircraft structural components 2 which, as mentioned above, may be fuselages, wings or other large aircraft structural components. The processing installation 1 has a processing station 3. The processing station 3 has, on the one hand, a clamping frame 4 for receiving the aircraft structural component 2 which is intended to be processed and, on the other hand, a processing unit 5 for processing the aircraft structural component 2.

The clamping frame 4 extends along a station longitudinal axis 6 which extends in a longitudinal direction X of the processing installation 1. The extent of the clamping frame 4 along the station longitudinal axis 6 is intended to be understood in broad terms. It means that the clamping frame 4 extends at least in a basic position parallel with the station longitudinal axis 6, for example, when the clamping frame 4 is orientated vertically and/or is orientated horizontally.

Figure 1:
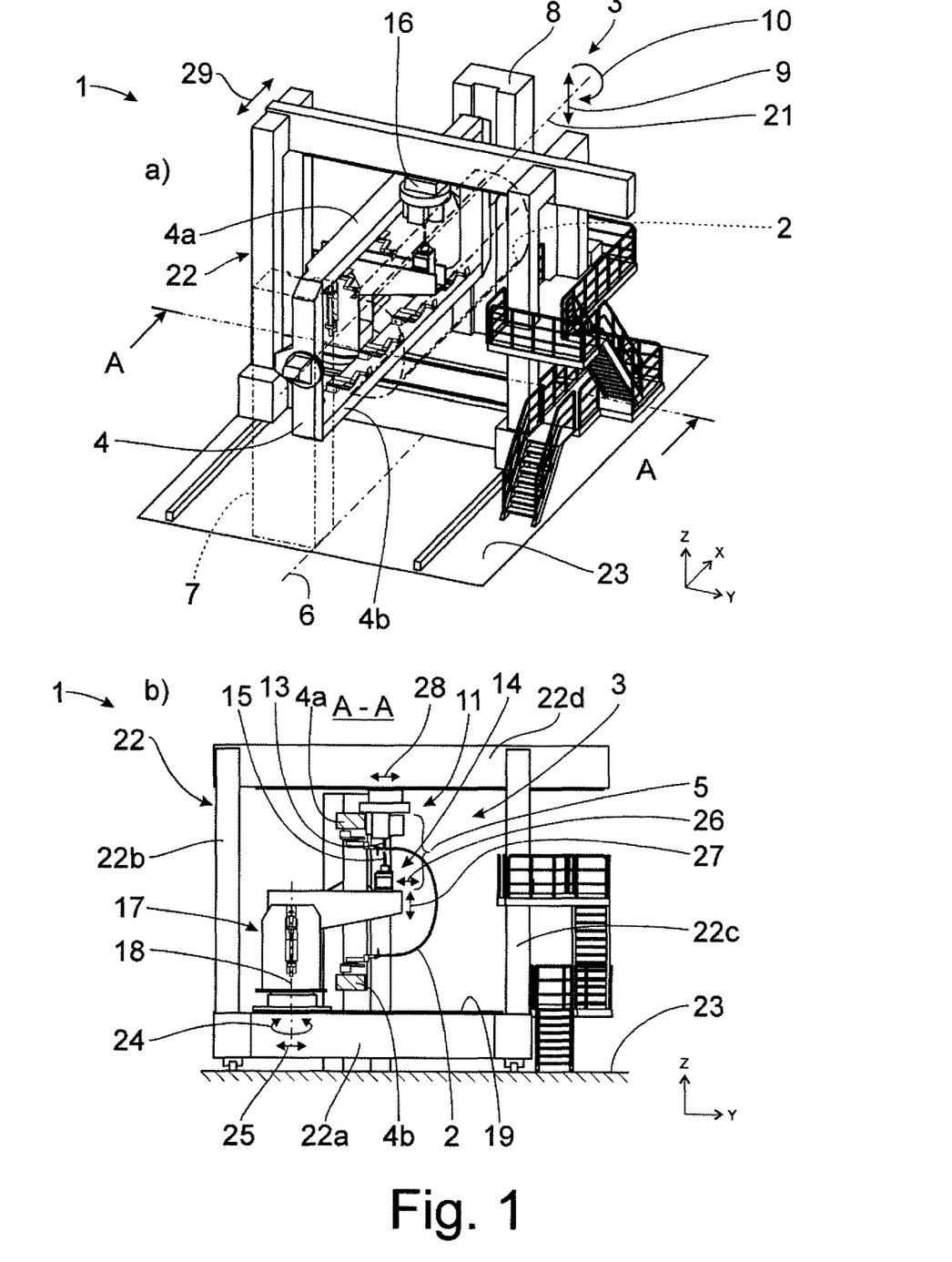
FIG. 1 shows a processing installation as proposed in a first processing position a) as a perspective view and b) as a cross-section.

The clamping frame 4 is in this instance articulated to two positioning towers 7, 8 which extend parallel with the vertical direction Z so as to be adjustable in terms of height and pivotable. The height adjustability is designated 9 in FIG. 1a and the pivotability is designated 10. In this instance, the height adjustability 9 may be possible separately for both positioning towers 7, 8 so that a tilting of the clamping frame 4 about a tilting axis which extends transversely relative to the station longitudinal axis 6 (not illustrated in this instance) can be produced.

The processing unit 5, which in this instance is a riveting unit, a drilling unit or a combined riveting/drilling unit, comprises an upper tool unit 11 having an upper tool 13 which is orientated along a first tool axis 12a and an associated lower tool unit 14 having a lower tool 15 which is orientated along a second tool axis 12b. The upper tool unit 11 and the lower tool unit 14 in each case form an end effector, wherein the upper tool 13 is in particular a rivet head or drill head and the lower tool 15 forms the corresponding counter-piece.

The first tool axis 12a and the second tool axis 12b extend at an angle and in this instance in particular in a direction orthogonal to the longitudinal direction X. This direction is in this instance also referred to as the vertical direction Z. In the embodiment in FIGS. 1 to 3, in each processing position of the upper tool 13 and of the lower tool 15, the first tool axis 12a and the second tool axis 12b are orientated coaxially relative to each other, thus both extend in alignment in the vertical direction Z. Both tool axes 12a, 12b are individually adjustable in the present case and therefore can be displaced in a parallel manner independently of each other in a plane which is orthogonal to the vertical direction Z. The adjustability of the lower tool 15 or the lower tool unit 14 is designated 26 in FIG. 1b and the adjustability of the upper tool 13 or the upper tool unit 11 is designated 28. In principle, however, it would also be conceivable to arrange at least one of the tool axes 12a, 12b, in particular the first tool axis 12a, in a non-movable manner relative to the station longitudinal axis 6.

The upper tool 13 and the lower tool 15 are in the embodiment described in this instance each supported on an associated tool carrier 16, 17, the upper tool 13 on an upper tool carrier 16 and the lower tool 15 on a lower tool carrier 17, wherein the tool carrier 16, 17 is in each case a component of the respective upper tool unit 11 or lower tool unit 14. The lower tool carrier 17 is in this instance rotatable about a lower tool carrier axis 18 which is parallel with the vertical direction Z and which forms a rotation axis, in particular through at least 180°, such as through at least 360°, which is designated 24 in this instance.

Figure 3:
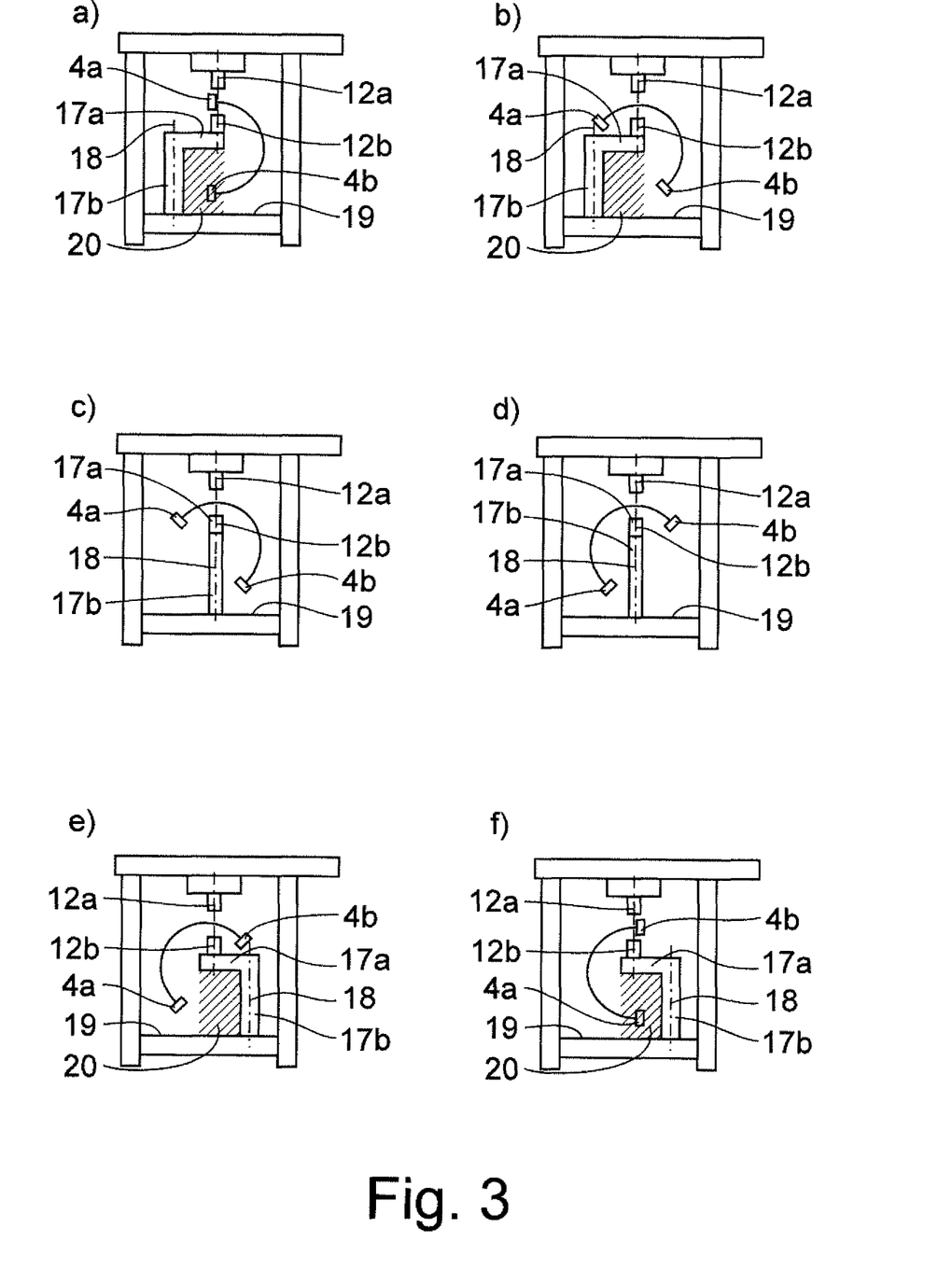

It is now advantageous that, as FIG. 3 shows, the respective tool axis 12a, 12b extends non-coaxially and in particular in a manner displaced in a parallel manner relative to the lower tool carrier axis 18 in at least one processing position, here in a plurality of processing positions, of the upper tool 13 and/or the lower tool 15. In other words, the upper tool 13 and the lower tool 15 are positioned, as FIGS. 3a, 3b, 3e and 3f show, so that the tool axis 12a, 12b thereof is offset relative to the lower tool carrier axis 18. However, the upper tool 13 and the lower tool 15 can also each be positioned in a processing position, as FIGS. 3c and 3d show, in which the associated tool axis 12a, 12b extends coaxially relative to the lower tool carrier axis 18. In this instance, during the processing of one and the same aircraft structural component 2, both processing positions, in which the respective tool axis 12a, 12b extends non-coaxially relative to the lower tool carrier axis 18, and processing positions, in which the respective tool axis 12a, 12b extends coaxially relative to the lower tool carrier axis 18 are passed through one after the other.

The horizontal offset between the tool axes 12a, 12b and the lower tool carrier axis 18 has the advantage that in the vertical direction Z above the fixing plane 19, in which the lower tool carrier 17 is rotatably supported, there is formed a free space 20 which extends as far as an upper portion 17a of the lower tool carrier 17. This free space 20 is used to partially receive the clamping frame 4 and the aircraft structural component 2 which is fixed thereto during different processing positions of the clamping frame 4. In these processing positions which are shown in FIGS. 3a and 3f, the clamping frame 4 is vertically orientated, that is to say, the frame portions 4a, 4b which extend parallel with the frame longitudinal axis 21 are arranged one above the other in the vertical direction Z, wherein in accordance with the respective processing position either the frame portion 4a with a portion of the aircraft structural component 2 arranged thereon or the frame portion 4b with a portion of the aircraft structural component 2 arranged thereon projects into the free space 20. Since, in the prior art, the free space 20 has to have at least substantially the same size in order to fulfil the same purpose, but the lower tool carrier 17 is configured in a C-shaped manner and a lower carrier portion of the lower tool carrier 17 projects into the space between the fixing plane 19 of the lower tool carrier 17 and the lower tool 15, in the prior art the necessary free space 20 must be made available above the lower carrier portion of the lower tool carrier 17. Since, however, in the processing installation 1 as proposed the lower tool carrier 17 does not have any such lower carrier portion which projects into the space between the fixing plane 19 and the lower tool 15, the free space 20 is arranged here further down in relation to the vertical direction Z. Accordingly, the lower tool 15 is also arranged further down, whereby the operating height is also reduced accordingly. Overall, the processing installation 1 can thereby have smaller dimensions at least in the vertical direction Z than in the prior art.

Figure 2:
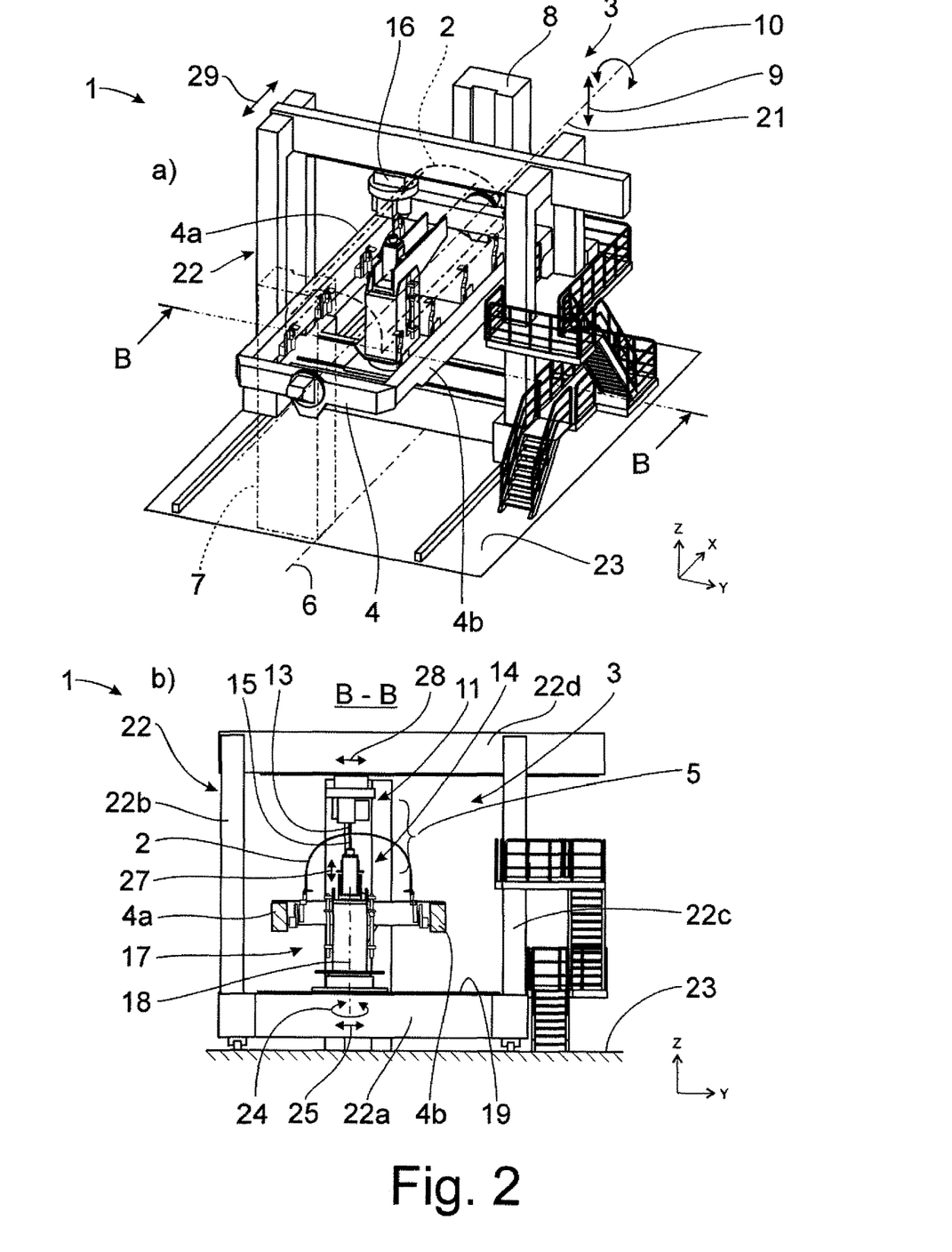
FIG. 2 shows the processing installation according to FIG. 1 in a second processing position a) as a perspective view and b) as a cross-section and FIG. 3 is a schematic view of the processing installation according to FIG. 1 in different processing positions.

In addition to the smaller dimensions of the processing installation 1 which are thereby enabled, an additional advantage of the solution as proposed is that the tools 13, 15 but also additional components of the processing installation 1 are more readily accessible. The processing of 180° shells as an aircraft structural component 2, as illustrated in the present embodiment in FIGS. 1 to 3, is also thereby facilitated.

In this instance, the fixing plane 19, on which the lower tool carrier 17 is rotatably supported, is formed by a lower frame portion 22a of a frame 22 which is constructed in a portal-like manner here. The term "portal-like" is intended to be understood in this instance to mean that the lower frame portion 22a which extends in a transverse direction Y which is orthogonal to the longitudinal direction X and vertical direction Z is connected at both sides to two frame portions 22b, 22c which extend in the vertical direction Z and which are spaced apart from each other in the transverse direction Y and which carry an upper frame portion 22d which also extends in the transverse direction Y. The upper frame portion 22d in turn carries the upper tool unit 11. In the region inside the frame 22, the clamping frame 4 to which the aircraft structural component 2 which is intended to be processed is fixed extends in particular in the longitudinal direction X. The clamping frame 4 is pivotable, as explained above, inside the frame 22 about the frame longitudinal axis 21, which is orientated here parallel with the station longitudinal axis 6, but can also be tilted relative thereto.

It may be noted that the frame 22 of the processing installation 1 may in principle also be configured differently in order to carry the upper tool unit 11. For example, it is also conceivable for the frame 22 to be configured in a C-shaped manner, that is to say, it has only a single lateral frame portion 22b which connects the lower frame portion 22a to the upper frame portion 22d. It is also conceivable to dispense with the lower frame portion 22a, wherein the lower tool carrier 17 would then have to be arranged on the substrate 23 independently of the frame 22. However, it is advantageous to arrange the lower tool carrier 17 securely with the frame 22 or on the lower frame portion 22a because in this manner the whole of the frame 22, upper tool unit 11 and lower tool unit 14 can be displaced relative to the clamping frame 4 and the aircraft structural component 2 in a longitudinal direction X or along the station longitudinal axis 6, wherein the upper tool unit 11 always remains orientated in an optimum manner relative to the lower tool unit 14. The displaceability of the frame 22 is designated 29 in FIG. 1a).

The lower tool carrier 17 has in this instance a carrier bar 17a as an upper carrier portion and a carrier tower 17b as a lateral carrier portion. The carrier tower 17b is in this instance supported rotatably on the lower frame portion 22a and extends substantially in the vertical direction Z. The carrier bar 17a is in this instance movably connected to the carrier tower 17b and extends from the carrier tower 17b substantially in a plane which is orthogonal to the vertical direction Z. The carrier bar 17a which is in this instance linearly displaceable in the vertical direction Z, which is designated 27, is used in this instance to support the lower tool 15. The unit comprising the carrier bar 17a and the carrier tower 17b forms an L-shape in this case.

In the embodiment described here, the lower tool carrier 17 is not only rotatably supported on the lower frame portion 22a, but also linearly displaceable in the transverse direction Y. Furthermore, in this instance, the lower tool 15 is linearly displaceable on the lower tool carrier 17, in particular at or on the carrier bar 17a, in a plane which is orthogonal to the vertical direction Z. The displaceability of the lower tool carrier 17 or the carrier tower 17b is designated 25 in FIG.

1b. The already-mentioned upper tool carrier 16 is also linearly displaceable on the upper frame portion 22d in the transverse direction Y, which is designated 28.

The individual rotational movements and linear movements of the above-mentioned components of the processing installation 1 can be brought about via drive motors, in particular via drive motors which are independent of each other (not illustrated). The processing installation 1 as proposed may thus have one or more of the following drive motors:
- a drive motor for the rotational movement of the lower tool carrier 17, in particular relative to the lower frame portion 22a, a drive motor for the linear movement of the lower tool carrier 17, in particular relative to the lower frame portion 22a,
- a drive motor for the linear movement of the lower tool 15, in particular relative to the lower tool carrier 17,
- a drive motor for a linear movement of the carrier bar 17a of the lower tool carrier 17, in particular relative to the carrier tower 17b of the lower tool carrier 17,
- a drive motor for the linear movement of the upper tool carrier 16, in particular relative to the upper frame portion 22d,
- a drive motor for the linear movement of the lower frame portion 22a or the frame 22, in particular relative to the substrate 23.

As a result of the above-described structure of the processing installation 1 as proposed, it is possible to orientate or arrange the individual components of the processing installation 1 relative to each other particularly so that, for example, the maximum adjustable spacing between the respective tool axis 12a, 12b and the lower tool carrier axis 18 is at least 1.0 m, at least 2.0 m, or at least 3.0 m (FIGS. 3a, 3b, 3e, 3f). The free space 20 may in this case have, in the vertical direction Z, a height of at least 2.0 m, at least 2.5 m, or at least 3.0 m. In particular, to this end the carrier bar 17a of the lower tool carrier 17 is spaced apart from the fixing plane 19 or from the lower frame portion 22a by at least 2.0 m, least 2.5 m, or at least 3.0 m. The width of the free space 20 in a plane which is orthogonal to the vertical direction Z, in particular the maximum adjustable width of the free space 20 in the transverse direction Y which results from the length of the carrier bar 17a, can also be at least 2.0 m, at least 2.5 m, or at least 3.0 m.

According to another teaching, a method for processing an aircraft structural component 2 having a processing installation 1 is provided.

It is significant in the method as proposed that, as a result of the construction of the processing installation 1 as proposed during the processing, in particular during a riveting or drilling operation, of the aircraft structural component 2, the first tool axis 12a and/or the second tool axis 12b can be positioned at least temporarily (FIGS. 3a, 3b, 3e, 3f) non-coaxially or in a manner displaced in a parallel manner relative to the lower tool carrier axis 18. In this manner, as explained above, there is provided a free space 20 which extends in a region under the lower tool 15 as far as the lower end of the lower tool carrier 17 or as far as the fixing plane 19 of the lower tool carrier 17, in which during processing the clamping frame 4 together with the aircraft structural component 2 fixed thereto can be partially introduced. In this manner, it is possible for, with a comparatively small operating height, an aircraft structural component 2, for example, a half-shell-like portion of a fuselage, readily to be able to be processed, wherein the clamping frame 4 with the aircraft structural component 2 arranged thereon can be pivoted in particular over an angular range of 180° or more about a frame longitudinal axis 21 which is in particular parallel with the station longitudinal axis 6.

The invention claimed is:

1. A processing installation for aircraft structural components comprising a processing station comprising a clamping frame for receiving an aircraft structural component which is intended to be processed, wherein the clamping frame extends along a station longitudinal axis which extends in a longitudinal direction, and a processing unit for processing the aircraft structural component which has an upper tool unit having an upper tool which is orientated along a first tool axis and a lower tool unit having a lower tool which is orientated along a second tool axis, wherein the first tool axis and the second tool axis are or can be orientated parallel with a vertical direction which is angular relative to the longitudinal direction, wherein in at least one processing position of the upper tool and in at least one processing position of the lower tool the first tool axis and the second tool axis are orientated coaxially relative to each other, and wherein the lower tool is supported on a lower tool carrier,
wherein in at least one processing position of the upper tool and/or in at least one processing position of the lower tool the respective tool axis extends non-coaxially relative to a lower tool carrier axis, wherein the lower tool carrier is linearly displaceable relative to a lower frame portion in a transverse direction, and wherein the lower tool is linearly displaceable relative to the lower tool carrier;
wherein the upper tool is supported on an upper tool carrier, wherein the upper tool carrier is supported on an upper frame portion which extends in the transverse direction; and
wherein the lower frame portion and the upper frame portion are connected to each other over at least one lateral frame portion, and wherein the lower frame portion, the at least one lateral frame portion and the upper frame portion are configured to be linearly displaceable together relative to a substrate.

2. The processing installation as claimed in claim 1, wherein in at least one processing position of the upper tool and/or in at least one processing position of the lower tool the respective tool axis is displaced in a parallel manner relative to the lower tool carrier axis.

3. The processing installation as claimed in claim 2, wherein the lower tool carrier is rotatably supported on the lower frame portion which extends in the transverse direction which is orthogonal to the longitudinal direction and vertical direction, wherein, in the at least one processing position in which the respective tool axis is non-coaxial or displaced in a parallel manner relative to the lower tool carrier axis, a free space is constructed between the lower tool and the lower frame portion and extends in the vertical direction from the lower frame portion as far as the lower tool or as far as a portion of the lower tool carrier on which the lower tool is supported.

4. The processing installation as claimed in claim 3, wherein the free space in the vertical direction has a height of at least 2.0 m.

5. The processing installation as claimed in claim 2, wherein in the at least one processing position the maximum adjustable spacing between the respective tool axis and the lower tool carrier axis is at least 1.0 m.

6. The processing installation as claimed in claim 1, wherein the lower tool carrier has a carrier bar, on which the lower tool is supported, and a carrier tower, which is rotatably supported and to which the carrier bar is fixed.

7. The processing installation as claimed in claim 6, wherein the carrier bar is spaced apart from the lower frame portion by at least 2.0 m, and/or extends in a plane which extends in the longitudinal direction and transverse direction from the carrier tower over a length of at least 2.0 m.

8. The processing installation as claimed in claim 7, wherein a free space extends between the carrier bar and the lower frame portion over the majority of the length of the carrier bar.

9. The processing installation as claimed in claim 6, wherein the carrier bar extends substantially in a plane which extends in the longitudinal direction and transverse direction and the carrier tower extends substantially in the vertical direction and/or the carrier bar and the carrier tower together form an L-shape.

10. The processing installation as claimed in claim 1, wherein the lower tool is linearly displaceable on the lower tool carrier in a plane which extends in the longitudinal direction and transverse direction.

11. The processing installation as claimed in claim 10, wherein the second tool axis can be arranged in at least one processing position of the lower tool coaxially relative to the lower tool carrier axis.

12. The processing installation as claimed in claim 1, wherein the lower frame portion is linearly displaceable in the longitudinal direction, together with the upper tool unit and lower tool unit.

13. The processing installation as claimed in claim 1, wherein the processing installation comprises:
    a first drive motor for a rotational movement of the lower tool carrier,
    a second drive motor for a linear movement of the lower tool carrier,
    a third drive motor for a linear movement of the lower tool,
    a fourth drive motor for a linear movement of a carrier bar of the lower tool carrier,
    a fifth drive motor for a linear movement of the upper tool carrier, and/or
    a sixth drive motor for a linear movement of the lower frame portion,
wherein the first drive motor, the second drive motor, the third drive motor, the fourth drive motor, the fifth drive motor and/or the sixth drive motor can be actuated independently of each other.

14. The processing installation as claimed in claim 1, wherein the upper tool carrier is linearly displaceable on the upper frame portion in the transverse direction, wherein the first tool axis can be arranged in at least one processing position of the upper tool coaxially relative to the lower tool carrier axis.

15. The processing installation as claimed in claim 1, wherein the first tool axis and the second tool axis are or can be orientated parallel with a vertical direction which is orthogonal relative to the longitudinal direction.

16. The processing installation as claimed in claim 1, wherein the lower frame portion and the upper frame portion each form a rigid joint with the at least one lateral frame portion.

17. A method for processing an aircraft structural component having a processing installation as claimed in claim 1,
    wherein during the processing of the aircraft structural component the first tool axis and/or second tool axis extend(s) at least temporarily non-coaxially relative to the lower tool carrier axis.

18. The method as claimed in claim 17, wherein during the processing of the aircraft structural component the first tool axis and/or second tool axis is/are at least temporarily displaced in a parallel manner relative to the lower tool carrier axis.

19. A processing installation for aircraft structural components comprising a processing station comprising a clamping frame for receiving an aircraft structural component which is intended to be processed, wherein the clamping frame extends along a station longitudinal axis which extends in a longitudinal direction, and a processing unit for processing the aircraft structural component which has an upper tool unit having an upper tool which is orientated along a first tool axis and a lower tool unit having a lower tool which is orientated along a second tool axis, wherein the first tool axis and the second tool axis are or can be orientated parallel with a vertical direction which is angular relative to the longitudinal direction, wherein in at least one processing position of the upper tool and in at least one processing position of the lower tool the first tool axis and the second tool axis are orientated coaxially relative to each other, and wherein the lower tool is supported on a lower tool carrier,
    wherein in at least one processing position of the upper tool and/or in at least one processing position of the lower tool the respective tool axis extends non-coaxially relative to a lower tool carrier axis, wherein the lower tool carrier is linearly displaceable relative to a lower frame portion in a transverse direction, and wherein the lower tool is linearly displaceable relative to the lower tool carrier;
    wherein the upper tool is supported on an upper tool carrier, wherein the upper tool carrier is supported on an upper frame portion which extends in the transverse direction;
    wherein the lower frame portion and the upper frame portion are connected to each other over at least one lateral frame portion, wherein the lower frame portion and the upper frame portion do not move with respect to the at least one lateral frame portion, and wherein the lower frame portion, the at least one lateral frame portion and the upper frame portion together form a C-shape or portal-like shape; and
    wherein the lower frame portion is linearly displaceable in the longitudinal direction, together with the upper tool unit and lower tool unit.

* * * * *